G. E. HINDLEY.
ELECTROMAGNETIC BRAKE OPERATING MECHANISM.
APPLICATION FILED MAR. 19, 1913.
1,121,725.
Patented Dec. 22, 1914.
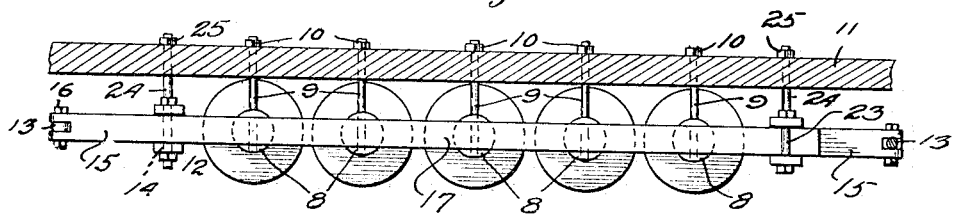
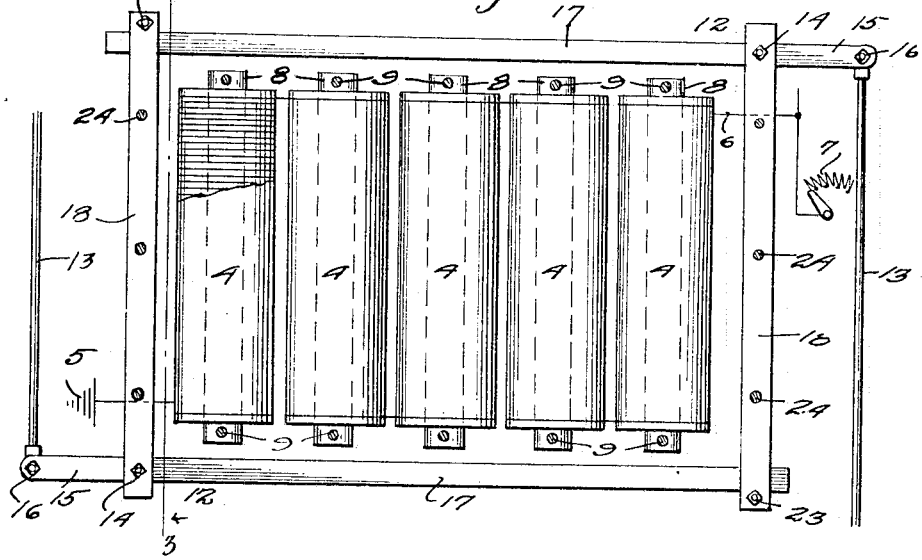
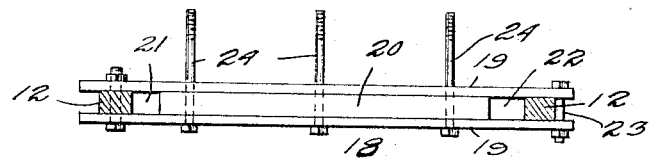
WITNESSES
G. M. Spring
Everett Lancaster
INVENTOR
George E. Hindley,
by Richard Bowen
his Attorney

UNITED STATES PATENT OFFICE.

GEORGE E. HINDLEY, OF PARK RIDGE, NEW JERSEY.

ELECTROMAGNETIC BRAKE-OPERATING MECHANISM.

1,121,725. Specification of Letters Patent. Patented Dec. 22, 1914.

Application filed March 19, 1913. Serial No. 755,434.

*To all whom it may concern:*

Be it known that I, GEORGE E. HINDLEY, a citizen of the United States, residing at Park Ridge, in the county of Bergen and State of New Jersey, have invented new and useful Improvements in Electromagnetic Brake-Operating Mechanism, of which the following is a specification.

My present invention relates to electromagnetic brake mechanism whereby the draw-bars of the brakes used on cars may be simultaneously actuated through the intermediacy of electro-magnets, which may be energized at the will of the operator, to set the brakes.

The principal object of my invention is to provide brake operating mechanism of the character described which is well adapted for use on electric cars or other vehicles having conductors carrying an electric current of required strength to energize electro-magnets which will actuate armatures operatively connected with the draw-bars of the brakes.

Other objects of my invention are to provide brake operating mechanism which is simple in construction, and hence inexpensive to manufacture; and, mechanism which is positive in its action without subjecting its parts to undue strain in operation.

In the drawing, forming a part of this specification: Figure 1 is a side elevation of the mechanism embodying my invention, showing it applied to the floor of a car. Fig. 2 is a plan view of the said mechanism, electrical connections being diagrammatically indicated. Fig. 3 is a sectional view on the line 3—3 of Fig. 2.

Similar characters refer to similar parts throughout the views.

While I hereinafter describe the invention as applied to cars having brake mechanism of that type including two draw-bars movable in counter directions simultaneously to set the brakes on different sets of wheels, it will be obvious that the invention is susceptible of modification to meet other conditions. I am therefore, to be understood as not limiting myself to the specific details, since changes may be made therein without departing from the spirit or scope of my invention.

I prefer to provide a plurality of electro-magnets 4 connected in series, grounded as indicated at 5 and receiving their current from conductor 6. A rheostat 7 may be provided to control the current. The electro-magnets are preferably disposed with their cores 8 in parallelism so that their adjacent ends lie in substantially the same plane. The electro-magnets are conveniently secured in connection with the cars as by bolts 9 passing through the cores 8 and secured by nuts 10 to the car floor 11.

A two armed lever 12 is provided for each brake draw-bar 13, these levers having a fulcrum as at 14. Preferably the shorter arm 15 of lever 12 is operatively connected with the draw-bar 13 as by pivot pin 16, and the longer arm 17, serves as an armature for coaction with the electro-magnets 4. The arm 17 is vibratable toward or from the adjacent ends of the cores 8, and it is to be noted that the cores 8 serve the dual purpose of actuating the two draw-bars 13 simultaneously in counter directions.

I prefer to support the levers 12 from beams 18, extending longitudinally of the electro-magnets 4, each beam being preferably constructed of two elongated members 19 spaced apart from each other by blocking 20, so as to provide guide slots 21 and 22, at each end of the beam. The one slot 21 receives one lever at its pivoted portion, and the other slot 22, receiving the end of arm 17 of the other lever. In order to provide a limit for the amplitude of vibration of lever 17, I dispose an abutment 23 in slot 22, against which the said arm contacts when moving away from the core faces. These abutments, as well as the pivots of the levers may be in the form of bolts passing transversely through the slots 22 and 21 respectively. The beams 18 may be secured to a car, by bolts 24 and nuts 25, in a manner similar to the securing of electro-magnets 4 in place.

The operation of the mechanism is as follows: Assuming that the electro-magnets are energized as by manipulation of rheostat 7, the levers 12 are swung on their fulcrums 14 by the magnetic flux acting upon armature 17, and the draw-bars 13 are thus actuated. It is to be noted that inasmuch as the draw-bar is connected to the shorter arm of its respective actuating lever, the force required to actuate the same is reduced to a minimum.

I claim:—

In brake operating mechanism, the combination with two draw-bars, of a plurality of electro-magnets having the adjacent ends of their cores in substantially the same plane, a beam extending longitudinally of said electro-magnets at both sides thereof, each beam having a guide slot at each end, a lever pivoted in one of the said slots of each of said beams and each lever including two arms, one of said arms being operatively connected with one of said draw-bars, and the other arm acting as an armature for coöperation with said electro-magnets and extending into the other slot of the other beam, and an abutment in each of the said slots of said beams receiving the said armature arms of said levers, to limit the amplitude of vibration of the latter, substantially as and for the purpose set forth.

GEORGE E. HINDLEY.

Witnesses:
 EDWARD C. GREISCH,
 HENRY J. MADER.

Copies of this patent may be obtained for five cents each, by addressing the " Commissioner of Patents, Washington, D. C."